TEMPERATURE OF FREEZER →

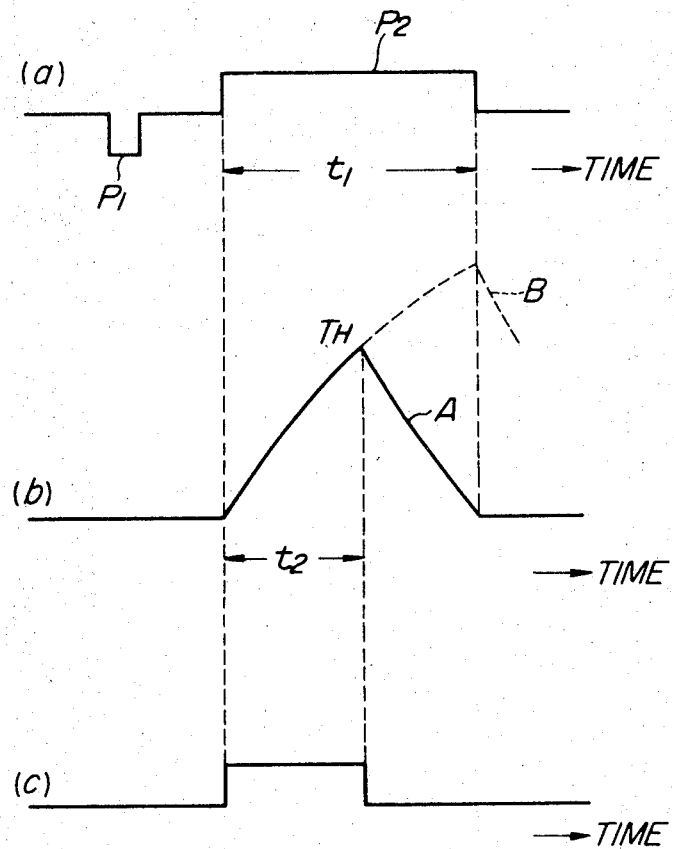

United States Patent Office 3,529,431
Patented Sept. 22, 1970

3,529,431
DEFROSTING CONTROLLER
Zenji Kusuda, Ibaragi-shi, and Takeji Kobayashi, Kyoto, Japan, assignors to Matsushita Electronics Corporation, Osaka, Japan, a corporation of Japan
Filed Aug. 27, 1968, Ser. No. 755,667
Claims priority, application Japan, Aug. 31, 1967, 42/56,276
Int. Cl. F25d 21/06
U.S. Cl. 62—155     3 Claims

ABSTRACT OF THE DISCLOSURE

A defrosting controller for electric refrigerators with freezers which operates under the control of an element for detecting temperature of the freezer during a defrosting operation and causes the defrosting heater to be deenergized regardless of the defrosting time predetermined by a defrosting timer when the temperature of the freezer rises to a predetermined temperature, thereby the frost deposited in the freezing compartment being completely removed without unnecessary heating of the freezer.

---

This invention relates to a defrosting controller for electric refrigerators with freezers whose operating time is automatically controlled depending on the amount of frost present.

In conventional electric refrigerators with freezers, the defrosting operation for removing frost accumulated in the freezer is generally controlled by a timer, which is started at a predetermined interval and continued for a predetermined period. With such a defrosting system whose operation is entirely depending on a predetermined timetable regardless of the actual amount of frost present, it is not unusual that the defrosting operation is continued after the frost has been completely removed, thereby unnecessarily warming the freezer and other space of the refrigerator, while in other cases, the operation is stopped before the frost is fully removed.

An object of this invention is to provide a defrosting controller whose operating time is automatically controlled depending on the amount of frost deposited in the freezer.

Another object of this invention is to provide a defrosting controller with which unnecessary warming of the freezer and the other space of the refrigerator can be avoided.

The above objects of this invention are achieved by a defrosting controller including a defrosting heater, a thyristor for controlling energization of said heater and a control circuit for triggering said thyristor, characterized in that said control circuit comprises a first transistor whose base bias voltage is supplied from a voltage divider including a thermistor thermally coupled with the freezer, a second transistor which operates in an opposite manner to that of said first transistor, and a third transistor for triggering said thyristor, said third transistor being normally nonconductive but operating in the same manner as that of said second transistor during a defrosting time predetermined by a defrosting timer, and that said first and second transistors in combination perform a switching operation having a hysteresis characteristics to turn said third transistor conductive only during said defrosting time, and said heater is energized through said thyristor which is turned conductive as a result of the conduction of said third transistor.

Figure 1:
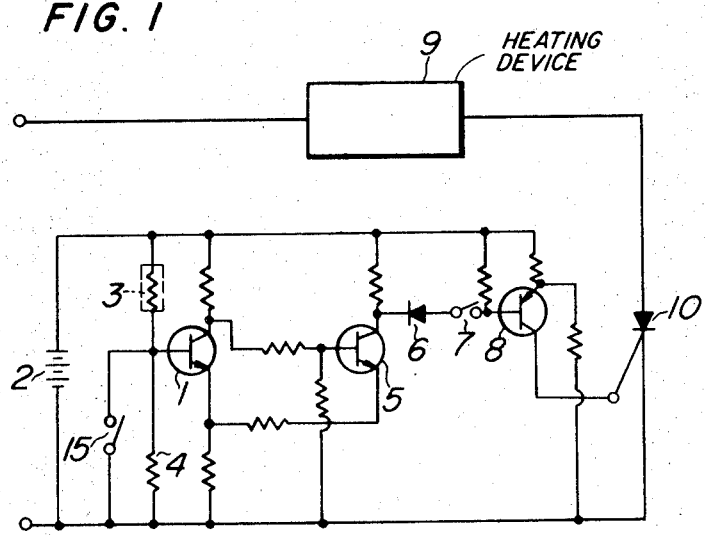
Figure 2:
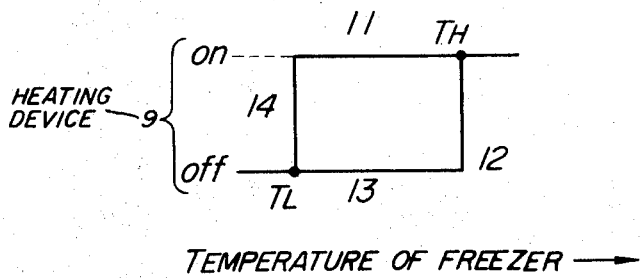

Hereunder, this invention will be explained in detail referring to the attached drawings in which;

FIG. 1 shows an electric circuit diagram of an embodiment of the defrosting controller of this invention; and FIGS. 2 and 3 are diagrams to explain the operation of the above defrosting controller.

Referring to FIG. 1, transistors 1 and 5 constitute a Schmitt circuit. The base of transistor 1 is connected to the junction point of thermistor 3 and resistor 4 which are connected in series across both terminals of source 2. The collector of transistor 5 is connected to the base of another transistor 8 through diode 6 and switch 7 which is operated by a defrosting timer (not shown). A heating device 9, such as an electric heater or a solenoid valve for hot gas, is connected into series with thyristor 10 to be able to heat the freezer. The control electrode of said thyristor 10 is connected to the collector of said transistor 8. Said thermistor 3 is placed in the vicinity of the freezer and its resistance is greatly affected by the temperature of the freezer.

In the above embodiment, while the freezer is effectively operating, transistor 1 is nonconductive as the resistance of the thermistor 3 is at a high value, and accordingly, transistor 5 is in a conductive state. In this state, if the defrosting timer switch 7 is closed according to the "defrost order" signal from the defrosting timer, transistor 8 is turned conductive thereby to switch the thyristor 10 to a conductive state. Consequently, the heating device 9 is energized to heat the freezer and to remove the frost on the freezer. After the frost has been completely removed from the freezer, the temperature of the thermistor 3 which is placed near the freezer starts to rise, thereby making the resistance lower. Consequently, transistor 1 becomes closed and in turn, transistor 5 nonconductive. Therefore, even though the defrosting timer switch 7 is kept in a conductive state by the defrosting timer, transistor 8 is nonconductive as the base of the transistor 8 is at the same potential as that of the emitter in this state of the transistor 5. Accordingly, thyristor 10 becomes nonconductive to turn off the heating device 9 and the operation of the freezer becomes effective again.

It should be noted that the above-described operation of the defrosting controller assumes a hysteresis characteristics. Namely, the process 11 illustrated in FIG. 2 in which the temperatute of the freezer is rising, indicates the fact that the heating device 9 is operating to remove the frost. When the frost is completely removed and the temperature of the freezer reaches the preset upper limit $T_H$, the heating device 9 is deenergized. This change of the operation corresponds to the process 12 in FIG. 2. After that, the temperature of the freezer gradually drops along the process 13, until it reaches the preset lower limit $T_L$. Then, the heating device 9 is again energized to warm the freezer through the process 14. It is important that the lower limit $T_L$ is set at a temperature as low as possible so that an ample difference can be provided between the lower limit $T_L$ and the upper limit $T_H$. Because, if the temperature of the freezer reaches the lower limit $T_L$ while the defrosting timer switch 7 is closed, the defrosting operation will start again, thereby unnecessarily preventing the freezer from imparting the freezing effect.

FIG. 3 shows an operational cycle of the controller shown in FIG. 1, (a) being the preset operating schedule of the defrosting timer, (b) showing transition of the temperature of the freezer, and (c) operating period of the heating device 9.

First, a reset pulse $P_1$ is let out from the timer. Switch 15 connected between the base of transistor 1 and the negative terminal of source 2 is then closed in response to the reset pulse $P_1$ to reset the controller completely. After that, defrosting signal $P_2$ is let out from the timer and accordingly defrosting timer switch 7 is closed. This state is kept so long as the defrosting signal $P_2$ lasts, the heating device 9 being operable during this state. Meanwhile, the temperature of the freezer rises as shown in (b), since the heating device 9 is energized with the start of the defrosting signal $P_2$. When the temperature of the freezer reaches the upper limit $T_H$, the heating device is deenergized and the temperature of the freezer drops as shown by line A. That is, the defrosting operation is carried on during a period $t_2$, though the defrosting timer switch 7 remains closed during period $t_1$. It will be noted that the period $t_1$ must be longer than the period $t_2$. In FIG. 3, curve B indicates the transition of temperature in a conventional freezer.

According to the defrosting controller, as described above, the frost deposited on the freezer is completely removed without unnecessary heating of the freezer. Thus a very satisfactory operation of a refrigerator with a freezer is ensured.

What we claim is:

1. A defrosting controller of electric refrigerators with freezers including a defrosting heating device, a thyristor for controlling energization of said heating device, a control circuit for triggering said thyristor, and a defrosting timer associated with a switch characterized in that said control circuit comprises a first transistor whose base bias voltage is supplied from a voltage divider including a thermistor thermally coupled with the freezer, a second transistor which operates in an opposite manner to that of said first transistor, and a third transistor for triggering said thyristor, said third transistor being normally nonconductive but operating in the same manner as that of said second transistor during a defrosting time predetermined by said defrosting timer, and that said first and second transistors in combination perform a switching operation having a hysteresis characteristic to turn said third transistor conductive only during said defrosting time, and said heating device is energized through said thyristor which is turned conductive as a result of the conduction of said third transistor.

2. A defrosting controller as defined in claim 1, which is further characterized in that said thyristor is automatically turned nonconductive to deenergize said heating device regardless of said predetermined defrosting time when said thermistor detects a predetermined upper limit of temperature.

3. A defrosting controller as defined in claim 1, which is further characterized in that said defrosting time is set so as to be longer than the period generally required for actual defrosting.

References Cited

UNITED STATES PATENTS

| | | | |
|---|---|---|---|
| 3,222,882 | 12/1965 | Sutton | 62—140 XR |
| 3,248,892 | 5/1966 | Sutton | 62—156 |
| 3,362,183 | 1/1968 | Sutton | 62—140 |
| 3,363,429 | 1/1968 | Wechsler | 62—140 |

MEYER PERLIN, Primary Examiner

U.S. Cl. X.R.

62—156